(12) United States Patent
Gregorius et al.

(10) Patent No.: US 7,212,038 B2
(45) Date of Patent: May 1, 2007

(54) LINE DRIVER FOR TRANSMITTING DATA

(75) Inventors: Peter Gregorius, Munich (DE); Armin Hanneberg, Haar (DE); Peter Laaser, Munich (DE)

(73) Assignee: Infineon Technologies AG, Munich (DE)

( * ) Notice: Subject to any disclaimer, the term of this patent is extended or adjusted under 35 U.S.C. 154(b) by 13 days.

(21) Appl. No.: 10/485,336

(22) PCT Filed: Jul. 25, 2002

(86) PCT No.: PCT/EP02/08292

§ 371 (c)(1),
(2), (4) Date: Sep. 16, 2004

(87) PCT Pub. No.: WO03/013084

PCT Pub. Date: Feb. 13, 2003

(65) Prior Publication Data

US 2005/0017762 A1    Jan. 27, 2005

(30) Foreign Application Priority Data

Jul. 30, 2001    (DE) .............................. 101 37 150

(51) Int. Cl.
*H03K 19/094* (2006.01)

(52) U.S. Cl. ........................ 326/87; 326/86; 327/52; 327/65; 327/112

(58) Field of Classification Search ............ 326/82–87; 327/52, 65, 112
See application file for complete search history.

(56) References Cited

U.S. PATENT DOCUMENTS 5,880,599 A * 3/1999 Bruno ........................ 326/56
5,999,044 A * 12/1999 Wohlfarth et al. .......... 327/563
6,304,106 B1 * 10/2001 Cecchi et al. ................ 326/86
6,437,599 B1 * 8/2002 Groen ......................... 326/63
6,498,511 B2 * 12/2002 Tamura et al. ............... 326/86

FOREIGN PATENT DOCUMENTS

WO    WO 03/009475 A2    1/2003

OTHER PUBLICATIONS

Mahadevan, Rajeevan et al., "A Differential 160 MHz Self-Terminating Adaptive CMOS Line Driver", IEEE Journal of Solid-State Circuits, vol. 35, No. 12, Dec. 2000, pp. 1889-1894, (6 pages).

(Continued)

*Primary Examiner*—Rexford Barnie
*Assistant Examiner*—Jason Crawford
(74) *Attorney, Agent, or Firm*—Maginot, Moore & Beck

(57) ABSTRACT

A line driver (3) for transmitting data with high bit rates, in particular for wire-bound data transmission in the full-duplex process, comprises a differential pair with differential pair transistors (14, 15) for generating transmission impulses as a function of the data to be transmitted, whereby the transmission impulses are preferably output via cascode transistors (16, 17), each with the differential pair transistors (14, 15) forming a cascode circuit, onto the data transmission line (8, 9) connected to the line driver (3). For reproducing the behaviour of the differential pair a replica differential pair with replica differential pair transistors (18, 19) is provided, generating replica impulses corresponding to the transmission impulses, which replica impulses can be fed via replica cascode transistors (20, 21) to a hybrid integrated circuit (6) for effecting echo compensation in relation to impulses received via the data transmission line (8, 9)

18 Claims, 6 Drawing Sheets

OTHER PUBLICATIONS

Roessler, Bernward et al., "CMOS Analog Front End of a Transceiver with Digital Echo Cancellation for ISDN", IEEE Journal of Solid-State Circuits, vol. 23, No. 2, Apr. 1988, pp. 311-317, (7 pages).

Shoval, Ayal, et al., "WA 18.7 A Combined 10/125Mbaud Twisted-Pair Line Driver with Programmable Performance/Power Features", IEEE International Solid-State Circuit Conference, 2000, pp. 314-315, (2 pgs), no month.

* cited by examiner

LINE DRIVER FOR TRANSMITTING DATA

FIELD OF THE INVENTION

The present invention relates to a line driver for transmitting data, in particular a line driver for transmitting wire-bound data in the full-duplex process with high bit rates.

BACKGROUND

For transmitting data in the full-duplex process, whereby data are both sent and received via the transmission line, generally the problem arises in a corresponding transceiver that each transceiver-generated transmission impulse, which is required to be sent via the same data transmission line, overlays and thus corrupts a signal received from the transceiver via the same data transmission line by cross modulation referred to as "echo". It is therefore state of the art to generate in the transceiver a replica that is as faithful as possible to each transmission impulse, referred to here as a "replica impulse", whereby the replica impulses can then be injected for echo and/or transmission impulse compensation on the receiver section of the transceiver, so that by subtracting this replica signal from the incoming signal an echo-compensated incoming signal can be received.

FIG. 9 as an example shows a circuit topology for the transmission path of such a transceiver according to the state of the art, whereby a digital/analogue converter 1 driven by control bits is illustrated, which in turn drives a line driver 3. The digital/analogue converter 1 and the line driver 3 are component parts of the transmitter of a combined transmitting and receiving device and/or a transceiver, whereby the transmission signal picked up at the outputs of the line driver 3 is fed via a converter 4 into a data transmission line, which is illustrated in FIG. 9 simplified by way of a load resistor 5. In order to produce an exact reproduction and/or replication of the transmission impulses of the line driver 3, the transmission signal has often been picked up externally, at the output of the transmitter and/or line driver 3 and fed via an external hybrid integrated circuit on the input of the receiver of the corresponding transceiver for echo compensation. With modern circuit topologies however this external hybrid integrated circuit is integrated on-chip for impedance matching and/or impedance correction, so that, as shown in FIG. 9, a replica 2 of the digital/analogue converter 1 is for example provided, the output of which is connected with an internal hybrid integrated circuit (not shown in FIG. 9) for echo compensation, whereby this internal hybrid integrated circuit is positioned with the line driver 3 on the same chip. The border between the internal component parts of the transceiver and the external wiring is indicated in FIG. 1 by a broken line. The advantage of this technology, apart from the large-scale integration, is the reduction in the requirement for analogue components in the receiving path of the transceiver, such as for example with regard to the dynamic range or to the resolution of the analogue/digital converter provided there.

With low-frequency applications, for example with ISDN/xSDL data transmission, this replica impulse can be made available with the aid of a parallel, additional internal line driver 3' having lower power consumption, which thus reproduces the behaviour of the actual line driver 3 and is coupled on the output side with a corresponding internal hybrid integrated circuit. An example of circuit topology of this kind is illustrated in FIG. 10.

A substantial problem here however is the adjustment of the replica path, also known as "matching". Here not only common component or DC errors (relating to offset and amplitude) but also transient error components (parasitic effects and band limitation effects) are of importance. The circuit technology used with circuit arrangements of this kind is often based on so-called OPA structures or generally on circuit configurations with feedback, for example so-called "shunt series", or "shunt-shunt" feedback arrangements. Although in principle higher linearity can therefore be obtained as a consequence of the feedback, at the same time bandwidth loss or higher power consumption for echo compensation results. Also relatively high complexity is necessary to generate the replica impulses, whereby over and above this in particular with high frequency systems high frequency oscillations can often occur due to cross modulation in the case of inappropriate circuit topology, which possibly limits the functionality of the entire circuit.

Therefore the object according to the present invention is to provide a line driver for transmitting data, with which the problems described above do not arise and the closest possible reproduction and/or replication of the transmission signals of the line driver can be generated with minimal technical circuit complexity.

SUMMARY

This object is achieved according by a line driver according to embodiments of the present invention.

The line driver according to the invention comprises at least one driver stage and/or driver cell, whereby with the aid of a first pair of transistors differentially driven as a function of a transmission signal, the transmission signal, and with the aid of a second pair of transistors in harmony with the first pair of transistors, the replication and/or reproduction of the transmission signal is generated. Thus the replica signal as well as the transmission signal is generated identically within one and the same driver stage and/or driver cell.

The line driver preferably has a multiplicity of such driver stages in each case with separate first and second pairs of transistors, whereby over and above this a separate pair of cascode transistors can be associated with each first and second pair of transistors in such a manner that the individual driver stages are switched in parallel at the load outputs of the line driver via the individual pairs of cascode transistors and/or are connected in common with a hybrid integrated circuit preferably configured internally and/or on-chip with the line driver. The number of these parallel-switched drivers to a large extent defines the amplitude of the transmission impulses generated by the line driver and transmission impulses to be transmitted via the data transmission line coupled with the line driver as well as the corresponding replica impulses.

The first pair of transistors of each driver stage, which can also be known as the differential pair, is preferably differentially driven with a separate control circuit and/or preliminary stage in such a manner that in the linked condition a certain maximum current always flows through the one path and/or branch of this pair of transistors and a certain minimum current through the other path and/or branch, so that, seen from the respective first pair of transistors, the load resistor is not dependent from a differential point of view on the signal amplitude, as a result of which non-linearity can again be significantly reduced.

The cascode transistors of each driver stage can be biased on their gate connections both with the aid of a common bias voltage and also with the aid of separate bias voltages. Likewise it is possible that the transmission and replica path of each driver at the low end or tail point of the corresponding pair of transistors are supplied with separate tail currents. This variant can be a substantial advantage in particular in connection with local mixing by transient impulses.

By employing additional capacitors, which are switched in parallel to the drain source sections and/or the output conductance of the transistors of the first and second pair of transistors, edge steepness can be limited due to the low-pass filtering of these capacitors realized thereby.

According to a further embodiment of the present invention the bias voltage of the cascode transistors can also be bled off from the preliminary stage and/or control circuit of the corresponding driver stage. This in particular takes place in such a manner that the drain source voltage of the corresponding first and second pair of transistors is bled off directly from the common mode voltage of the respective control circuit, so that with appropriate dimensioning both the temperature progression of the individual voltages and also the synchronization can be optimised.

The relative accuracy of the replica impulse generated by the second pair of transistors and/or differential pair of each driver stage is increased by employing the special control circuit and/or preliminary stage already mentioned above. Over and above this the relative accuracy of the replica impulse is increased by the symmetrical arrangement of the corresponding transistors, which are preferably one and the same line type, as well as by good matching of these transistors to one another. The implementation of the line driver described within the context of the present invention furthermore ensures common rise times and therefore symmetrical edge steepness both of the transmission impulses and the replica impulses.

The present invention is preferably suitable for wire-bound data transmission in the so-called full-duplex process with high bit rates. Apart from the high linearity described above the line driver according to the invention furthermore also meets the customary demands, for example concerning low supply voltage and minimal power consumption and spacing requirements. Replication of the transmission signal necessary for echo compensation, as mentioned above, is preferably generated internally on the chip of the line driver. The measures proposed for this within the scope of the present invention guarantee faithful reproduction of the transmission signal and/or the transmission impulses both with regard to linearity and with regard to the reactive accuracy of transmission impulse to replica impulse.

Naturally however the present invention is not limited to the preferred range of application of wire-bound data transmission, but can be used generally wherever highly exact reproduction of the transmission signal and/or transmission impulses of the line driver with as simple a means as possible is desirable. In particular the invention can therefore in principle also be used for wireless data transmission.

The present invention is described below in more detail with reference to the appended drawing on the basis of preferred embodiments.

DETAILED DESCRIPTION

Figure 1:
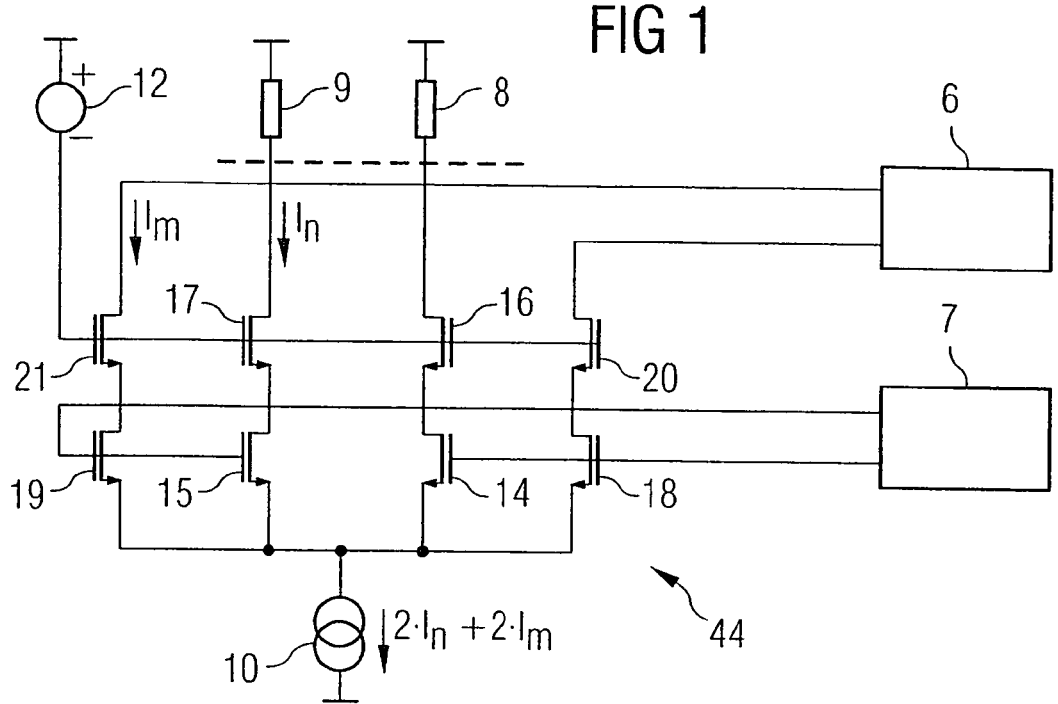
FIG. 1 shows a line driver according to a first embodiment of the present invention.

FIG. 1 shows a basic cell and/or a driver stage of a line driver according to one embodiment of the present invention. Normally several of these driver stages illustrated in FIG. 1 operate in parallel, whereby the individual driver stages at the outputs of the line driver operate in parallel with the corresponding data transmission line, which is indicated in FIG. 1 in the form of external load resistors 8, 9.

As shown in FIG. 1, the driver stage comprises a pair of transistors 14, 15, also called a differential pair below, which are controlled via their gate connections by differential control signals of a control circuit 7 in such a manner that a certain maximum current always flows via the one transistor of this differential pair, while a certain minimum quiescent current flows via the other transistor of this differential pair, that is to say the so-called tail current of the differential pair is reversed in each case after modulation by the control circuit 7 into the one and/or other path of this differential pair, so that a corresponding transmission impulse can be generated at the outputs of the line driver connected with the transmission line. The external arrangement of the load resistors 8, 9 representing the data transmission line is indicated by a broken line in FIG. 1. The pulse amplitude substantially depends on the number of driver stages operated in parallel at the load resistors 8, 9 with the structure shown in FIG. 1. An advantage of this arrangement is that the pulse form can be produced in each case depending on the required standard (for example IEEE Standard 802.3ab—1999 for 1 G Ethernet data transmission) by the corresponding digital drive of the control circuit 7. Additional analogue functions, for example for pre-filtration, are not necessary. Likewise no complex analogue circuitry is necessary. The drive of the two transistors 14, 15 of the differential pair, which are also referred to below as differential pair transistors, can be configured accordingly for maintaining the edge steepness and/or be can be matched through additional arrangement of capacitors parallel to the differential pair transistors.

For reproduction of the behaviour of the differential pair transistors 14, 15, which—as described above—are differentially driven by the control circuit 7 as a function of the data to be transmitted, in order to generate a corresponding transmission impulse at the load outputs of the line driver, a further differential pair with differential pair transistors 18, 19, is provided, whereby these differential pair transistors 18, 19 are controlled similarly to and/or in harmony with the differential pair transistors 14, 15 as a function of the data to be transmitted, which in the case of the embodiment shown in FIG. 1, is realized due to the fact that in each case the same control signal of the control circuit 7 is applied onto the gate connections of the differential pair transistors 14, 18 on the one hand and onto the gate connections of the differential pair transistors 15, 19 on the other hand. Since the differential pair with the differential pair transistors 18, 19 is provided for reproducing the behaviour of the differential pair with the differential pair transistors 14, 15, this differential pair is also referred to below as a replica differential pair. Due to common driving by the control circuit 7 the differential pair with the differential pair transistors 14, 15 and the replica differential pair with the replica differential pair transistors 18, 19 have the same edge steepness and also the same temporal progression. This represents a substantial advantage, since no additional delays ("skew") occur between the transmission impulse generated by the differential pair transistors 14, 15 and the replica impulse generated by the replica differential pair transistors 18, 19.

As shown in FIG. 1, further transistors 16, 17 are switched in series with the differential pair transistors 14, 15, which with the differential pair transistors 14, 15 form a cascode circuit and are therefore also referred to as cascode transistors below. As already described, in the transmission case a voltage rise is produced via the external load resistors 8, 9. The voltage drop would substantially model the drain source section of the differential pair transistors 14, 15 without the additional cascode transistors 16, 17. This could cause an additional error in the amplitude and/or in the linearity due to the minimal output steepness of the transistors. Therefore the cascode transistors 16, 17 are used for increasing the output steepness.

In order to guarantee synchronization under different load conditions between the transmission path and the replica path, corresponding cascode transistors 20, 21 are also provided for the replica differential pair transistors 18, 19, which cascode transistors are interconnected with regard to the replica differential pair transistors 18, 19 similarly to the cascode transistors 16, 17.

All transistors illustrated in FIG. 1 relate to NMOS transistors, which according to FIG. 1 are interconnected with one another. The gate connections of the cascode transistors 16, 17 and/or replica cascode transistors 20, 21 are in each case biased with the bias voltage supplied by a voltage source 12. The source connections of the individual differential pair transistors 14, 15 and/or replica differential pair transistors 18, 19 are connected in common with a power source 10. While the respective transmission impulse can be picked up on the drain connections of the cascode transistors 16, 17 connected with the load outputs of the line driver, the corresponding replica impulse can be picked up on the drain connections of the replica cascode transistors 20, 21. For this reason the drain connections of the replica cascode transistors 20, 21 are connected with the internal hybrid integrated circuit 6, which for echo compensation, as already described above, subtracts the replica signal from a signal received via the corresponding data transmission line, in order to obtain an echo-compensated incoming signal. The structure of the hybrid integrated circuit 6 as well as the echo compensation corresponds to the known state of the art, so that this point does not need to be further elaborated. However in connection with the present invention it is important that the hybrid integrated circuit 6 involves an internal hybrid integrated circuit, which together with the preliminary stage realized by the control circuit 7 and the output stage of the line driver realized by the remaining components shown in FIG. 1 is integrated on one and the same chip.

A further advantage of the circuit topology shown in FIG. 1 is the good adjustment and/or good matching of the replica path to the transmission path. The replica differential pair transistors 18, 19 can be positioned in the circuit topology in a suitable arrangement optimally co-ordinated with the differential pair transistors 14, 15. The translation and/or reduction ratio of the transmission path to the replica path can almost be selected at random, however sometimes very large translation ratios may not be desirable due to increasing mismatch between the transmission path and the replica path.

Figure 8:
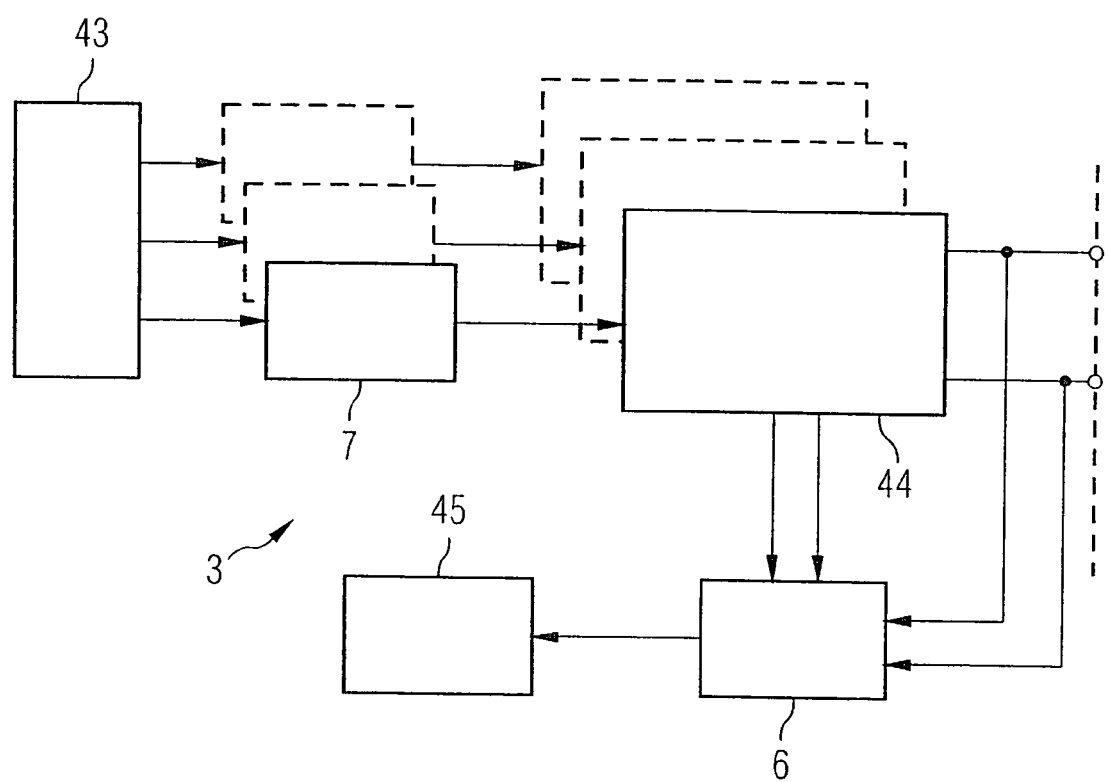
FIG. 8 shows an analogue line interface for Fast Ethernet applications with a line driver according to the invention.
Figure 9:
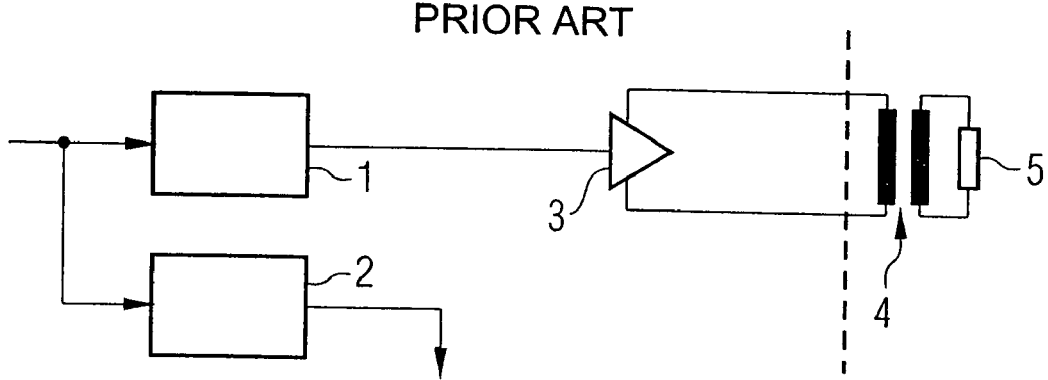
FIG. 9 and FIG. 10 show line drivers with the generation of replica impulses according to the state of the art.
Figure 10:
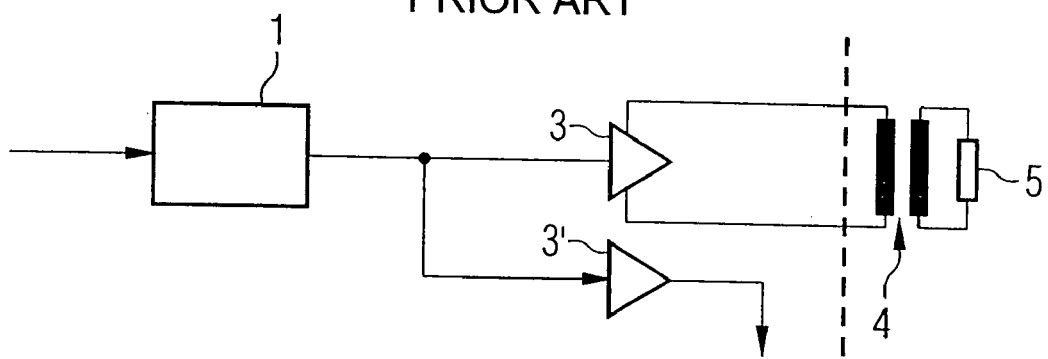

In FIG. 1 a driver stage of a line driver is shown, wherein the driver stage is provided with the reference symbol 44. As previously mentioned, several such driver stages 44 usually operate in parallel at the load outputs of the line driver. In this connection the structure of an analogue line interface of a transceiver designed for example for Fast Ethernet data transmission is illustrated with a line driver 3 of this kind in FIG. 8. From FIG. 8 it is clear that several driver stages 44 of the type for example shown in FIG. 1 operate in parallel at the load outputs of the line driver 3. Each driver stage 44 is associated with a separate control circuit 7, which in each case generates differential control signals as a function of the data to be transmitted provided for switching the corresponding differential pair transistors and/or replica differential pair transistors. In the transmission path there is also provided a pulse former 43 in the form of a digital filter, which effects a pulse pre-distortion and as a function of the data to be transmitted in each case generates complementary control signals for the control circuits 7, so that the differential control signals for the individual driver stages 44 can be generated as a function thereof. The driver stages 44 in each case have a transmission path with differential pair transistors 14, 15 and cascode transistors 16, 17 as well as a replica path with replica differential pair transistors 18, 19 and replica cascode transistors 20, 21 (see FIG. 1). The replica impulses generated in this way in the individual preliminary stages 44 are fed to the internal hybrid integrated circuit 6, which for echo compensation subtracts the replica impulses from the impulses received via the data transmission line. The incoming impulses which are echo-compensated in this way are fed by the (internal) hybrid integrated circuit 6 to a receiver 45 of the corresponding transceiver for further signal processing.

In the case of the embodiment shown in FIG. 1 the source connections of the differential pair transistors 14, 15 and the replica differential pair transistors 18, 19 are connected in common with the power source 10 already mentioned. If the current flowing via a branch of the differential pair is designated with $I_n$ and the current flowing via a branch of the replica differential pair is designated with $I_m$, the power source 10 must be dimensioned in such a manner that it supplies a current $2 \times I_n +$ to $2 \times I_m$.

The transmission path and the replica path can however also be supplied with separate tail currents. A corresponding embodiment is illustrated in FIG. 1. The embodiment shown in FIG. 2 differs from the embodiment shown in FIG. 1 only in that the source connections of the replica differential pair transistors 18, 19 are connected with a first power source 10 and the source connections of the differential pair transistors 14, 15 with a second power source 11. The power source 10 is therefore provided exclusively for supply of the replica path, while the power source 11 serves exclusively for supply of the transmission path. The supply of the transmission and replica path with separate tail currents shown in FIG. 2 can in particular be advantageous in connection with local mixing by transient pulses at the low end and/or tail point of the transmission and replica path.

Figure 2:
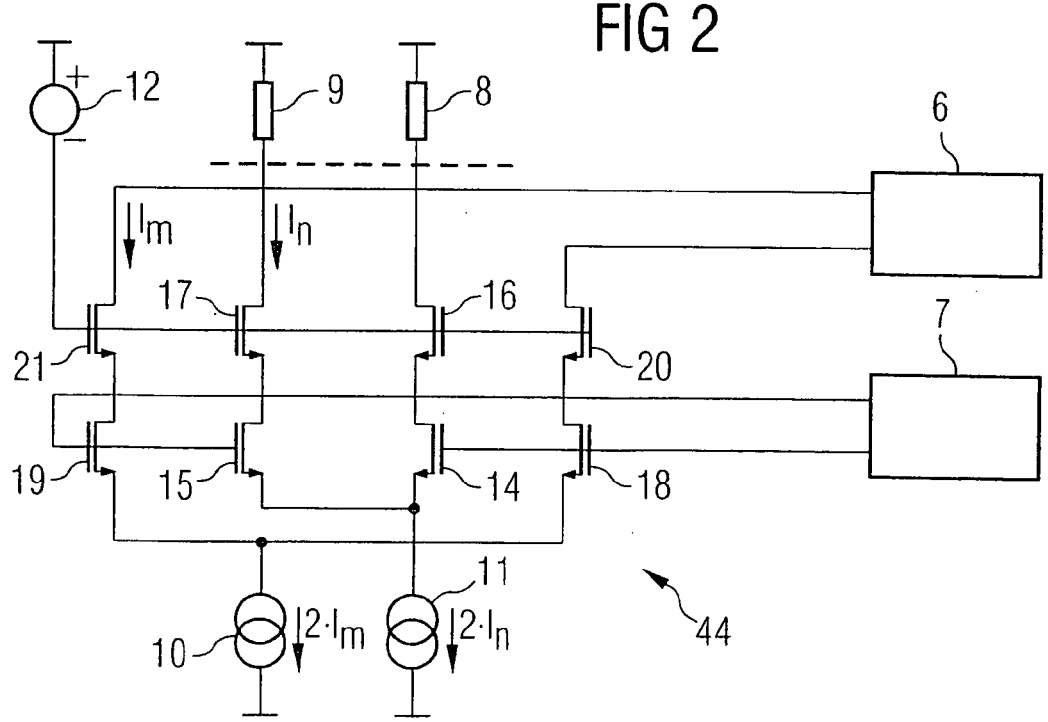
FIG. 2 shows a line driver according to a second embodiment of the present invention.
Figure 3:
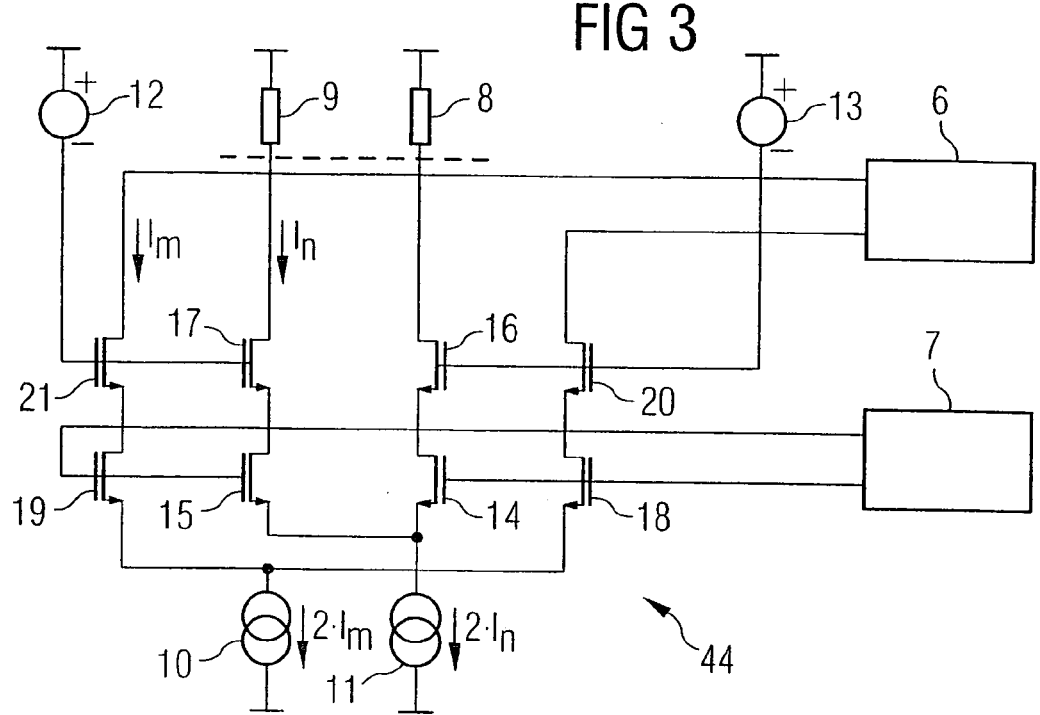
FIG. 3 shows a line driver according to a third embodiment of the present invention.

FIG. 3 shows a further embodiment of a line driver according to the invention, whereby as a continuation of the embodiment shown in FIG. 2 the cascode transistors 16, 17 and replica cascode transistors 20, 21 are not connected to a common voltage supply, but a first voltage supply 12 is provided for the left-hand cascode transistor 17 and for the left-hand replica cascode transistor 21 and a second voltage supply 13 is provided for the right-hand cascode transistor 16 and for the right-hand replica cascode transistor 20. The separate voltage supply of the cascode transistors and/or replica cascode transistors shown in FIG. 3 enables transient parasitic inductions by cross modulation of the individual paths to each other via the gate source sections of the cascode and/or replica cascode transistors to be avoided. Also in the case of the embodiment shown in FIG. 3 separate power sources 10, 11 are provided for the replica path and/or transmission path.

Figure 4:
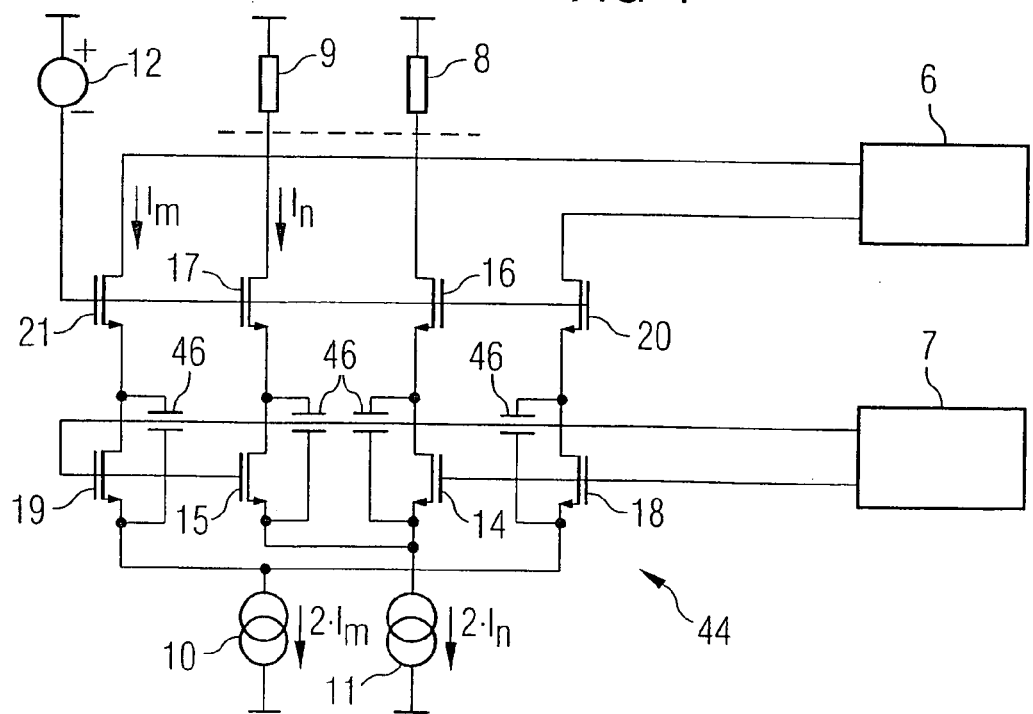
FIG. 4 shows a line driver according to a fourth embodiment of the present invention.

As already indicated above, the edge steepness can be limited by the parallel connection of capacitors to the differential pair transistors 14, 15 and/or cascode differential pair transistors 18, 19. A corresponding embodiment is illustrated in FIG. 4, wherein the capacitors switched in parallel to the output conductor of the differential pair transistors 14, 15 and/or cascode differential pair transistors 18, 19 have been given the reference symbol 46 in each case. Otherwise the embodiment shown in FIG. 4 corresponds to the embodiment shown in FIG. 2.

Figure 5:
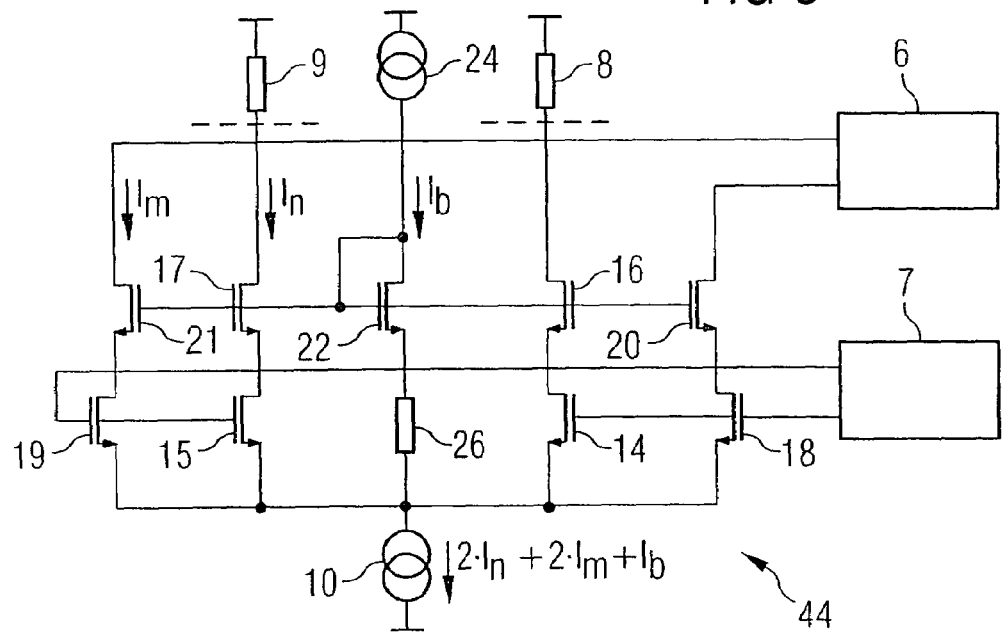
FIG. 5 shows a line driver according to a fifth embodiment of the present invention.

FIG. 5 shows a further embodiment of the line driver according to the invention, wherein the embodiment shown in FIG. 5 corresponds to a variant for production of the bias voltage of the cascode transistors 16, 17 and/or replica cascode transistors 20, 21. In the case of the embodiment shown in FIG. 5 an additional transistor 22 is provided, which operates with the current $I_b$ from an additional power source 24. This additional transistor 22 forms a current mirror together with the transistors 17 and 21 and/or 16 and 20. For adjusting the ideal operating point, that is to say the ideal drain source voltage of the differential pair transistors 14, 15 and/or the replica differential pair transistors 18, 19, the transistor 22 is degenerated in relation to the tail and/or low end of the differential pair transistors 14, 15 and replica differential pair transistors 18, 19, whereby for this purpose a resistor 26 and/or a circuit element having a linear voltage/current characteristic is switched between the source connection of the transistor 22 and the common tail point of the differential pair transistors 14, 15 and the replica differential pair transistors 18, 19. The voltage drop at the resistor 26 corresponds in the synchronization to the gate source voltage of the differential pair transistors 14, 15 and the replica differential pair transistors 18, 19. Since the potential for supplying the cascode transistors 16, 17 and/or the replica cascode transistors 20, 21 is bled off via the tail point of the differential pair and/or replica differential pair connected during operation with the voltage supply 10, synchronization is also ensured in the dynamic operational case if the circuit has been dimensioned correctly. Otherwise the embodiment shown in FIG. 5 corresponds with the embodiment shown in FIG. 1, in that this embodiment, just like every other embodiment described herein, can operate both with only one common power source 10 and also with two separate power sources 10, 11 for the transmission and/or replica path.

Figure 6:
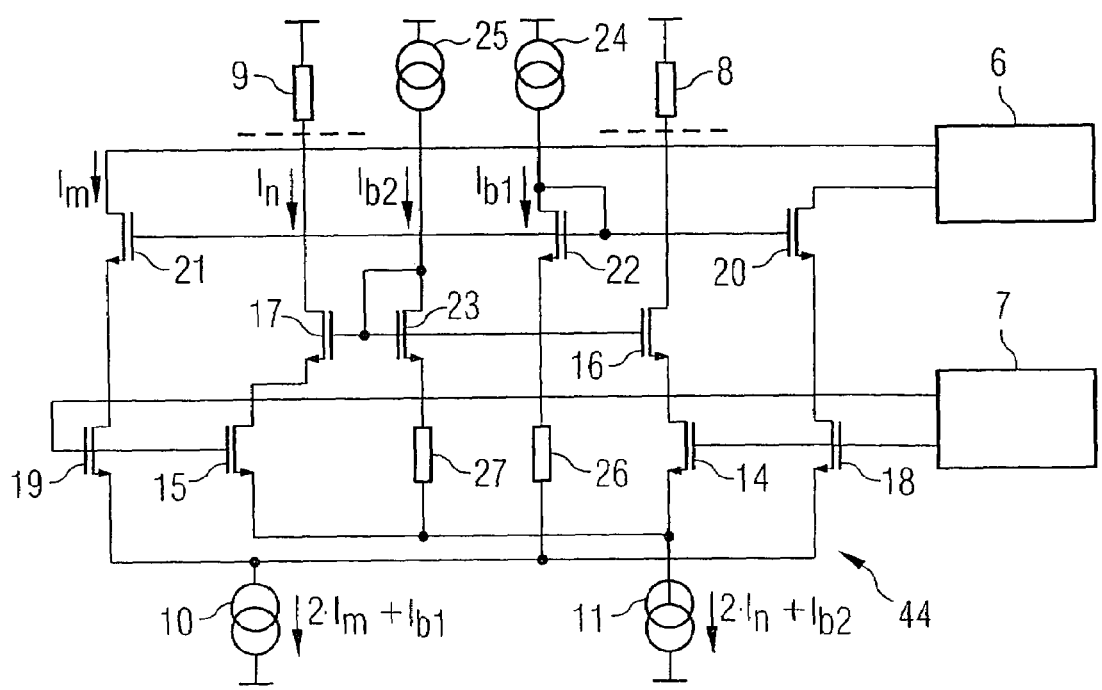
FIG. 6 shows a line driver according to a sixth embodiment of the present invention.

A further embodiment shown in FIG. 6 corresponds in principle to the embodiment shown in FIG. 5, whereby however the cascode voltage supplies for the replica path and the transmission path are provided separately for better isolation and thus to avoid cross-modulation of the transmission path on the replica path. Therefore a transistor 22 operated with a power source 24 and switched in series is provided for the replica cascode transistors 20 and 21, which source connection is switched in series with a resistor 26, that is again connected with the tail and/or low end of the replica differential pair transistors 18, 19. For the cascode transistors 16 and 17 however there are provided a separate power source 25, a separate transistor 23 and a separate resistor 27, which are interconnected in the transmission path in similar fashion to the power source 24, the transistor 22 and the resistor 26 in the replica path. The transistor 23 with its drain connection is therefore connected to the power source 25 and with its source connection connected to the resistor 27. The resistor 27 is connected with its other connection to the source connections of the differential pair transistors 14, 15 and the power source 11. The gate drain section of the transistors 22, 23 is in each case shorted as in the case of the transistor 22 shown in FIG. 5. The embodiment shown in FIG. 6 therefore corresponds in principle to a combination of the embodiments shown in FIG. 2 and FIG. 5, since on the one hand separate power sources 11 and 10 for the transmission and replica path are provided and on the other hand separate cascode voltage supplies with a power source 25 and/or 24, which delivers a current $I_{b2}$ and/or $I_{b1}$, an additional transistor 23 and/or 22 and an additional resistor 27 and/or 26 are provided.

Figure 7:
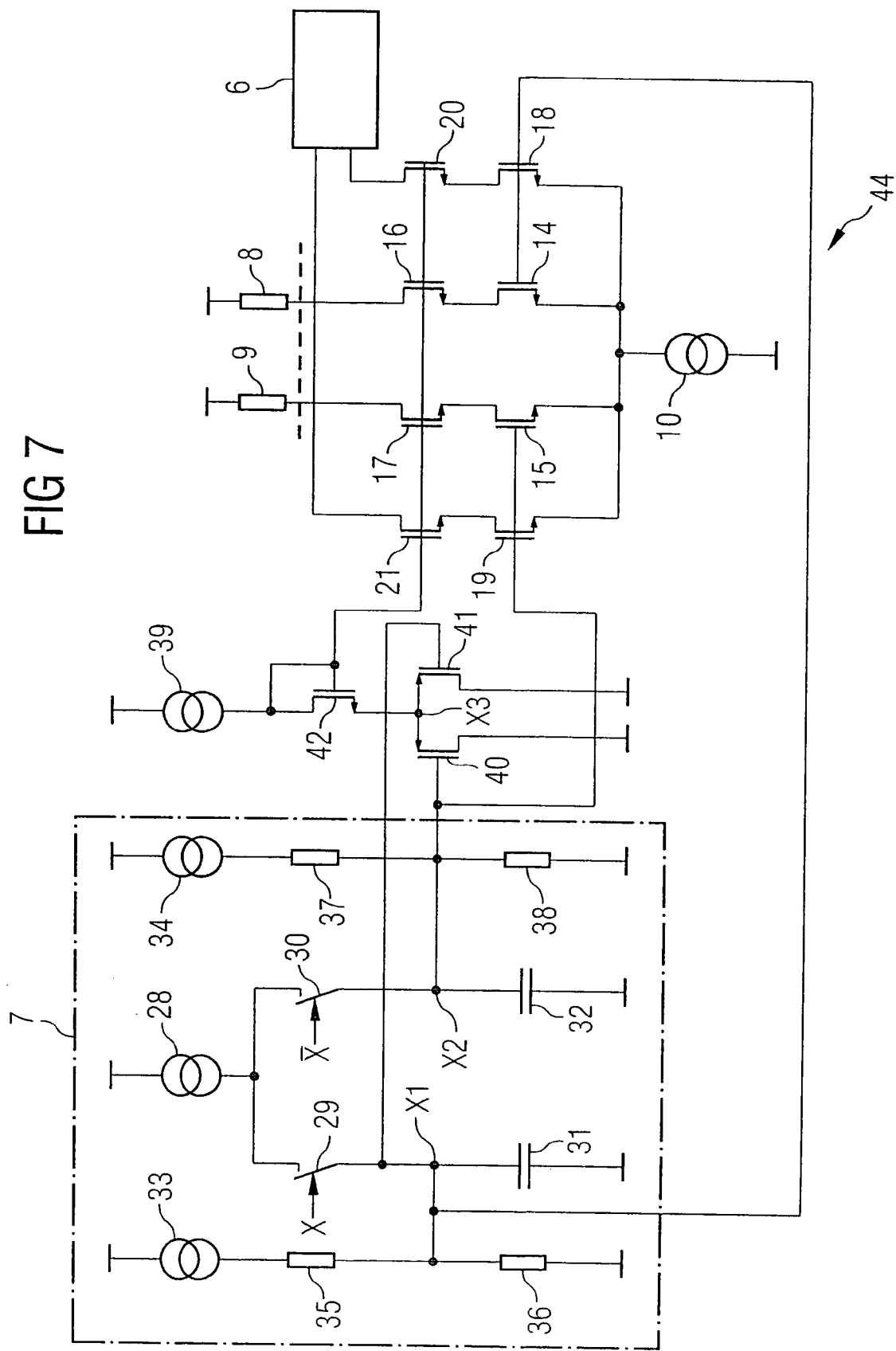
FIG. 7 shows a line driver according to a seventh embodiment of the present invention.

Finally FIG. 7 shows a further embodiment of a line driver according to the invention and/or a driver stage 44 of the same, whereby the supply voltage and/or bias voltage of the cascode transistors and replica cascode transistors are bled off from the control circuit 7 of the corresponding driver stage 44.

As shown in FIG. 7, the control circuit 7 of each driver stage can comprise two controllable logic elements 29, 30, preferably in the form of transfer gates, supplied by a power source 28, which logic elements are controlled in each case as a function of the data to be transmitted by complementary control signals X and ▫ and therefore can be alternately opened and closed. The control signals X and ▫ can for example originate from the pulse former 43 shown in FIG. 8. The logic elements 29, 30 are in each case connected with voltage divisors, which comprise resistors 35, 36 and/or 37, 38, which operate with a power source 33 and/or 34. The control signal for the right-hand differential pair transistor 14 and the right-hand replica differential pair transistor 18 and/or for the left-hand differential pair transistor 15 and the left-hand replica differential pair transistor 19 is picked up between the resistors 35 and 36 and/or 37 and 38 on a node X1 and/or X2. The nodes X1 and X2 are also coupled with capacitors 31 and/or 32, in order to obtain a low-pass filter effect relating to these control signals. The structure of the control circuit 7 described above is not limited to the embodiment illustrated in FIG. 7, but equally can also be transferred and/or applied to the embodiments described above.

A circuit comprising transistors 40–42 and a power source 39 is used to bleed off the bias voltage for the cascode transistors 16, 17 and replica cascode transistors 20 and 21. The transistor 42 can, like the transistors 14–23 described above, involve an NMOS transistor, while the transistors 40 and 41 preferably relate to PMOS transistors. The voltage lying on the nodes X2 and/or X1 is picked up via the transistors 40 and 41, whereby based on the circuitry of the transistors 40 and 41 shown in FIG. 7 an average of the voltages picked up at the nodes X1 and X2, which is applied via the transistor 42 onto the gate connections of the cascode transistors 16, 17 and the replica cascode transistors 20, 21, is provided at a node X3 between the source connections of the transistors 40 and 41. The drain connection of the transistor 42 is connected with the power source 39, and the gate drain section of the transistor 42 is short-circuited. The transistor 42 similarly to transistors 22, 23 shown in FIG. 5 and FIG. 6 and the cascode transistors 16, 17 and/or the replica cascode transistors 20, 21 forms a cascode circuit. The advantage of the embodiment shown in FIG. 7 consists in the fact that the drain source voltage of the differential pair transistors 14, 15 and the replica differential pair transistors 18, 19 is bled off directly from the common mode voltage of the control circuit 7 and also corresponds to the average of the gate source voltages of the transistors 40 and 41, so that if the dimensioning is appropriate the temperature progression of the individual voltages and also the synchronization can be optimised.

Based on simulations it could be established that by means of the present invention not only the object described above and the advantages described above can be realized, but the single impulse and/or total impulse form realizable through application of the present invention also lies within the impulse form limits specified by the respective standard.

Figure 11:
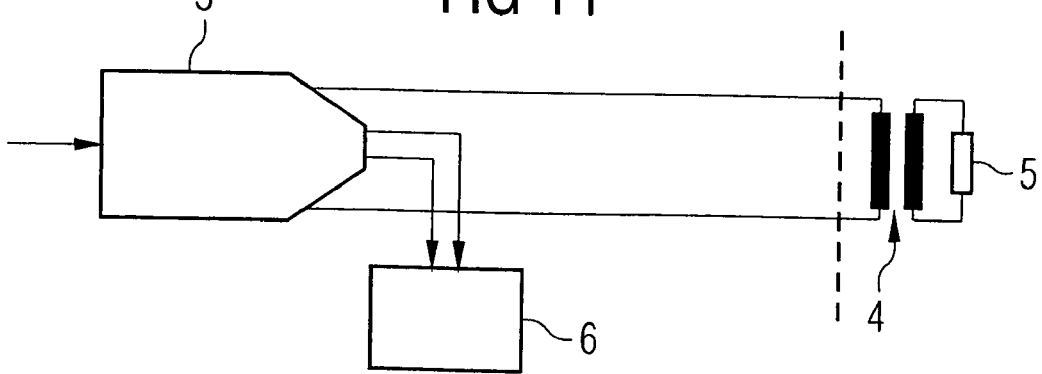
FIG. 11 shows the structure of a transmitter for Fast Ethernet applications with a line driver according to the invention.

In FIG. 11 the structure of a transmitter for Fast Ethernet applications with a line driver according to the invention, in which the transmission path for generating the transmitter impulses and the replica path for generating the replica impulses is realized schematically within a circuit block and/or within a driver stage. The circuit block 3 shown in FIG. 11 in this case comprises both the functionality of the digital/analogue converter 1 shown in FIG. 1 and FIG. 2 and also of the line driver according to the invention. FIG. 11 also shows the internal hybrid integrated circuit 6.

The invention claimed is:

1. A line driver including at least one driver stage, the at least one driver stage comprising:
   a first pair of transistors differentially driven as a function of data to be transmitted, the first pair of transistors configured to generate an impulse for a transmission line,
   a second pair of transistors associated with the first pair of transistors and configured to generate a replica impulse that corresponds to the impulse generated by the first pair of transistors, wherein the second pair of transistors are switched in a synchronous manner with respect to the first pair of transistors, the first pair of transistors and the second pair of transistors configured to receive the same drive signals, and
   a control circuit configured to generate the drive signals in the form of first and second differential control signals, a first differential control signal provided to a transistor of the first pair of transistors and a transistor of the second pair of transistors, and a second differential control signal provided to the other transistor of the first pair of transistors and the other transistor of the second pair of transistors.

2. The line driver according to claim 1, wherein each of the first pair of transistors and each of second pair of transistors includes a port connected to a common power source.

3. A line driver including at least one driver stage, the at least one driver stage comprising:
   a first pair of transistors differentially driven as a function of data to be transmitted, the first pair of transistors configured to generate an impulse for a transmission line,
   a second pair of transistors associated with the first pair of transistors and configured to generate a replica impulse that corresponds to the impulse generated by the first pair of transistors, wherein the second pair of transistors are switched in a synchronous manner with respect to the first pair of transistors,
   a third pair of transistors, each of the third pair of transistors being coupled between a data transmission output of the line driver and a corresponding transistor of the first pair of transistors, and
   a fourth pair of transistors, each of the fourth pair of transistors coupled in series with a corresponding transistor of the second pair of transistors.

4. The line driver according to claim 3, wherein the transistors of the third pair of transistors and the transistors of the fourth pair of transistors are biased with a common bias voltage.

5. The line driver according to claim 3, wherein the transistors of the third pair of transistors are biased with a first bias voltage and the transistors of the fourth pair of transistors are biased with a second bias voltage.

6. The line driver according to claim 3, wherein each of a bias voltage for the third pair of transistors and a bias voltage for the fourth pair of transistors is bled off from a control circuit.

7. The line driver according to claim 3, wherein each of the first pair of transistors and each of second pair of transistors includes a port connected to a common power source.

8. The line driver according to claim 7, wherein the at least one driver stage further includes:
   a bias transistor configured to couple to a power source, the bias transistor having a control port coupled to control ports of the third pair of transistors and control ports of the fourth pair of transistors,
   a linear device having a linear voltage/current characteristic coupled in series between the bias transistor and the common power source.

9. The line driver according to claim 3,
   wherein the at least one control circuit is operable to switch the first pair of transistors and the second pair of transistors in a contemporaneous manner.

10. The line driver according to claim 9, wherein one or more bias voltages for the third pair of transistors and the fourth pair of transistors is bled off of the control circuit.

11. The line driver according to claim 9, wherein:
   the control circuit comprises two logic elements switched complementarily as a function of the data to be transmitted, the two logic elements connected to corresponding nodes on which differential control signals for the first pair of transistors and the second pair of transistors are picked up, and
   the at least one driver stage further comprises an intermediate circuit coupled to receive the voltages on the corresponding nodes of the control circuit, the intermediate circuit operable to generate an average of these voltages as the bias voltage for at least the third pair of transistors.

12. The line driver according to claim 9, wherein the intermediate circuit comprises two transistors of a first type and a third transistor of a second type, each of the two transistors having a control port connected to a corresponding one of the corresponding nodes, each of the two transistors having a second port connected in common with the third transistor, the third transistor providing the bias voltage to the third pair of transistors.

13. A line driver including at least one driver stage, the at least one driver stage comprising:
- a first pair of transistors differentially driven as a function of data to be transmitted, the first pair of transistors configured to generate an impulse for a transmission line, wherein each of the transistors of the first pair of transistors includes a port connected to a common first power source, and
- a second pair of transistors associated with the first pair of transistors and configured to generate a replica impulse that corresponds to the impulse generated by the first pair of transistors, wherein the second pair of transistors are switched in a synchronous manner with respect to the first pair of transistors, wherein each of the transistors of the second pair of transistors includes a port connected to a common second power source.

14. A line driver including at least one driver stage, the at least one driver stage comprising:
- a first pair of transistors differentially driven as a function of data to be transmitted, the first pair of transistors configured to generate an impulse for a transmission line,
- a second pair of transistors associated with the first pair of transistors and configured to generate a replica impulse that corresponds to the impulse generated by the first pair of transistors, wherein the second pair of transistors are switched in a synchronous manner with respect to the first pair of transistors, and
- a first capacitor coupled in parallel to a first of the first pair of transistors, and a second capacitor coupled in parallel to a second of the first pair of transistors.

15. A line driver including at least one driver stage, the at least one driver stage comprising:
- a first pair of transistors differentially driven as a function of data to be transmitted, the first pair of transistors configured to generate an impulse for a transmission line,
- a second pair of transistors associated with the first pair of transistors and configured to generate a replica impulse that corresponds to the impulse generated by the first pair of transistors, wherein the second pair of transistors are switched in a synchronous manner with respect to the first pair of transistors, and
- a hybrid integrated circuit operably coupled to the second pair of transistors to receive replica impulses therefrom, the hybrid integrated circuit operable to subtract the replica impulses from impulses received via a data transmission line coupled to the first pair of transistors.

16. The line driver according to claim 15, wherein the hybrid integrated circuit is integrated onto a common substrate with the at least one driver stage.

17. A line driver including at least one driver stage, the at least one driver stage comprising:
- a first pair of transistors differentially driven as a function of the data to be transmitted, the first pair of transistors configured to generate an impulse for a transmission line, and
- a second pair of transistors associated with the first pair of transistors configured to generate a replica impulse that corresponds to the impulse generated by the first pair of transistors,
- a hybrid integrated circuit operably coupled to the second pair of transistors to receive replica impulses therefrom, the hybrid integrated circuit operable to subtract the replica impulses from impulses received via a data transmission line coupled to the first pair of transistors,
- wherein the first pair of transistors and the second pair of transistors are configured to receive the same drive signals.

18. The line driver according to claim 17, wherein the at least one driver stage further comprises:
- a third pair of transistors, each of the third pair of transistors being coupled between a data transmission output of the line driver and a corresponding transistor of the first pair of transistors, and
- a fourth pair of transistors, each of the fourth pair of transistors coupled in series with a corresponding transistor of the second pair of transistors.

* * * * *